United States Patent
Gansner et al.

(10) Patent No.: US 7,889,200 B2
(45) Date of Patent: *Feb. 15, 2011

(54) SYSTEM AND METHOD FOR GENERATING CIRCULAR LAYOUT GRAPHS

(75) Inventors: Emden Gansner, Morristown, NJ (US); Yehuda Koren, Elizabeth, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/638,169

(22) Filed: Dec. 15, 2009

(65) Prior Publication Data

US 2010/0182322 A1    Jul. 22, 2010

(51) Int. Cl.
*G06T 11/20* (2006.01)
(52) U.S. Cl. .................................. 345/440; 715/734
(58) Field of Classification Search ................ None
See application file for complete search history.

*Primary Examiner*—Andrew Wang
*Assistant Examiner*—David H Chu
(74) *Attorney, Agent, or Firm*—Fay Kaplun & Marcin, LLP

(57) ABSTRACT

A system and method for identifying a plurality of nodes for a circular layout, each of the plurality of nodes to be connected via an edge to at least one other of the plurality of nodes, fixing all of the plurality of nodes on a unit circle, except for one of the nodes, moving the unfixed node to a barycenter of the fixed plurality of nodes, projecting the unfixed node to the unit circle of the circular layout and displaying the circular layout.

20 Claims, 7 Drawing Sheets

700

SYSTEM AND METHOD FOR GENERATING CIRCULAR LAYOUT GRAPHS

PRIORITY CLAIM

This application claims priority to U.S. patent application Ser. No. 11/746,756 filed on May 10, 2007 entitled "System and Method for Generating Circular Layout Graphs". The entire disclosure of the prior application is considered as being part of the disclosure of the accompanying applications and hereby expressly incorporated by reference herein.

BACKGROUND OF THE INVENTION

Circular layouts are among the most prominent and oldest conventions used to draw graphs. This drawing convention is often used for the layout of networks and systems management diagrams, where it naturally captures the essence of ring and star topologies. It may be also used for other kinds of graphs, such as social networks and WWW graphs. In particular, a circular layout is appropriate for applications that emphasize the clustering decomposition of a graph, where each cluster is drawn on a separate circle.

In circular layouts, nodes are drawn on a circle, while the edges connecting these nodes are line segments passing within the circle. In general, these layouts may provide a compact presentation, focusing on individual nodes and edges. Additionally, well-designed circular layouts sometimes reveal global properties of the graph such as symmetries and patterns of collective behavior. Unfortunately, strong regularity can obscure other information. For example, circular layout drawings can be very dense, and following paths on them can be difficult.

SUMMARY OF THE INVENTION

A method for identifying a plurality of nodes for a circular layout, each of the plurality of nodes to be connected via an edge to at least one other of the plurality of nodes, fixing all of the plurality of nodes on a unit circle, except for one of the nodes, moving the unfixed node to a barycenter of the fixed plurality of nodes, projecting the unfixed node to the unit circle of the circular layout and displaying the circular layout A system having a memory storing data corresponding to a plurality of nodes and a plurality of edges connecting the nodes, a processor receiving the data and generating a circular layout from the data, wherein the processor fixes all of the plurality of nodes to a unit circle, except for one of the nodes, moves the unfixed node to a barycenter of the fixed plurality of nodes and projects the unfixed node to the unit circle of the circular layout and a display displaying the circular layout.

DETAILED DESCRIPTION OF EXEMPLARY EMBODIMENTS

Figure 1:
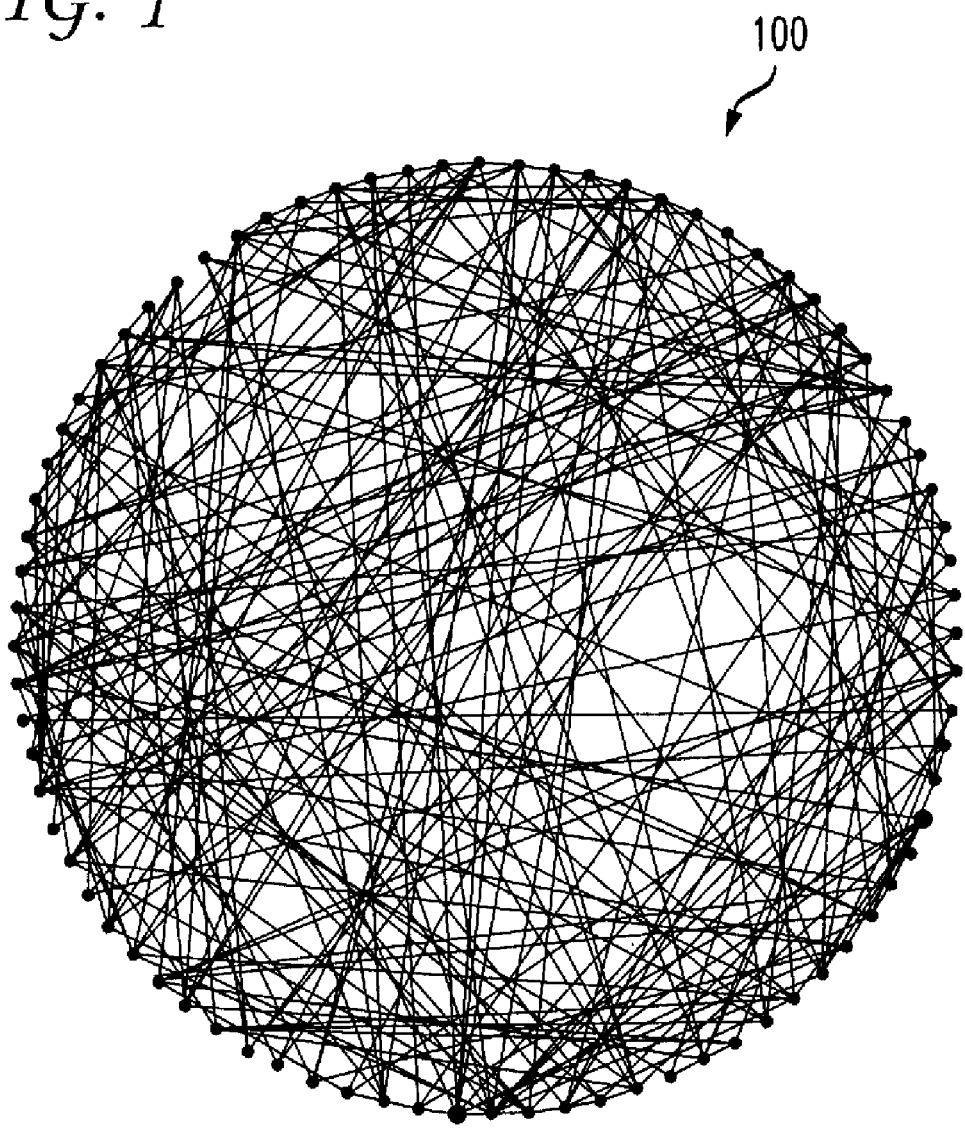
FIG. 1 illustrates an example of a prior art circular layout graph.

The present invention may be further understood with reference to the following description and the appended drawings, wherein like elements are referred to with the same reference numerals. The exemplary embodiments are directed to creating diagrams and, more particularly to methods of creating circular graph layouts having increased clarity and readability.

FIG. 1 shows a circular graph 100 generated using a prior art method. The data used to create the circular graph, is the same data used for the creation of the improved circular layout using the exemplary embodiments of the present invention. The graph 100 illustrates the readability problem of the graphs generated according to the prior art methods. Using the exemplary methods according to the present invention, the clarity and readability of circular layout graphs is increased.

Figure 2:
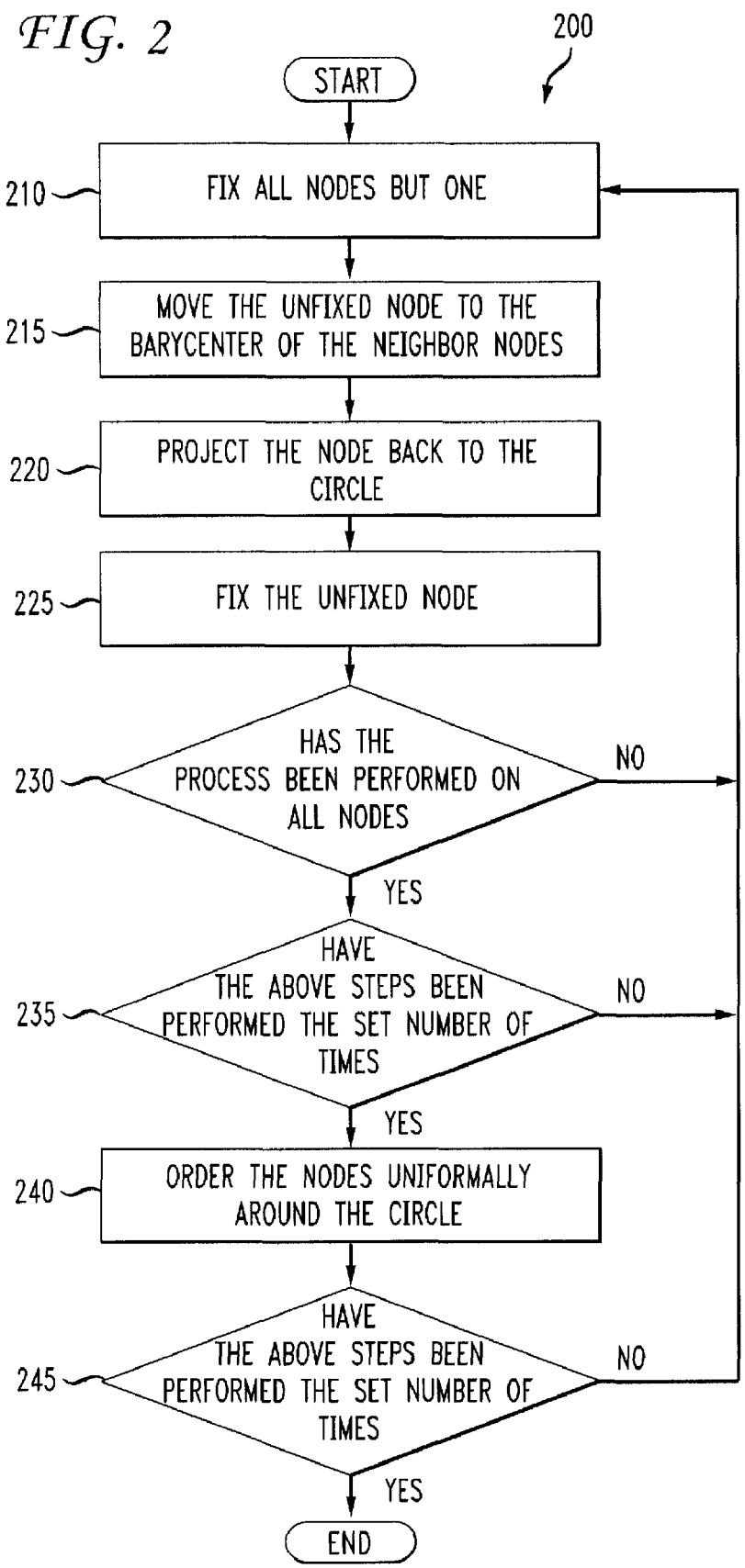
FIG. 2 illustrates the steps of a method of edge-length minimizing implemented according to an embodiment of the invention.

FIG. 2 illustrates an exemplary embodiment of a method 200 for minimizing edge length in a circular graph, and thus clutter and density. The description of the method 200 will reference the circular graph 300 shown in FIG. 3, including the node 105 and the edge 110. As will be seen in more detail below, the method 200 implicates all the nodes and edges of the circular graph 300. However, only a single node 105 and single edge 110 is labeled for the purpose of illustrating the exemplary method 200. The steps of method 200 and other methods described herein are exemplary and the order of the steps may be rearranged as a matter of design choice.

The coordinates of an individual node i 105, selected from a plurality of nodes, may be denoted as $i \in V$ by $(x_i, y_i) \in R^2$. It may then be assumed that the plurality of nodes are arranged on the unit circle centered at the origin. The goal of the process 200 is the minimization of total squared edge lengths, resulting in the following optimization problem:

$$\min_{x,y} \sum_{(i,j) \in E} (x_i - x_j)^2 + (y_i - y_j)^2 \qquad \text{Equation 1}$$

$$\text{subject to: } x_i^2 + y_i^2 = 1, i = 1, \ldots, n$$

However, in addition to the optimization problem, the exemplary method also accounts for the unit circle constraints. Such equality constraints may be addressed by Lagrange multipliers. Therefore, for each individual node i 105, a Lagrange multiplier $\lambda_i$ is introduced and the function is defined as:

$$f(x, y, \lambda) = \sum_{(i,j) \in E} (x_i - x_j)^2 + (y_i - y_j)^2 + \sum_{i=1}^{n} \lambda_i (x_i^2 + y_i^2 - 1) \qquad \text{Equation 2}$$

Any minimum of Equation 1 should be a zero for all partial derivatives of Equation 2. In other words:

∂f/∂x=0, ∂f/∂y=0, ∂f/∂λ=0

This means that for each individual node i 105:

$$(x_i, y_i) = \frac{1}{1-\lambda_i} \frac{\sum_{j \in N(i)} (x_i, y_i)}{\|N(i)\|}$$

where $N(i)=\{j | <I,J> \in E\}$ is the set of a plurality of nodes that are neighbors of the individual node i 105.

Effectively, this means that each individual node on the unit circle (including node 105), should lie on the line connecting the origin and the barycenter of its neighbors. Equivalently, the angular coordinate of each individual node is the mean of the angular coordinates of the plurality of its neighbor nodes, while the radial coordinate is 1. If each individual node was given an imaginary mass, identical to the masses of the remaining plurality of nodes; the barycenter is the point where the mass of the system of nodes may be considered to be concentrated.

To solve this problem, the method 200 begins in step 210 by fixing all the nodes of the graph, except for the selected individual node 105. In step 215 the unfixed single node 105 is moved to the barycenter of its neighbors. Then, in step 220, the unfixed node 105 is projected back to the circle. The formulas for this operation are:

$$(x_i, y_i) \leftarrow \frac{\sum_{j \in N(i)} (x_i, y_i)}{\|N(i)\|} \quad (1)$$

$$(x_i, y_i) \leftarrow \frac{(x_i, y_i)}{\|(x_i, y_i)\|} \quad (2)$$

In step 225 the selected individual node 105 that is unfixed, is fixed. In step 230 it is determined if the preceding steps 210-225 have been performed on all the plurality of nodes. If the steps have not been performed for all of the plurality of nodes, the method loops back and the steps 210-225 are performed on a different node from the previously selected node 105.

When it is detected that steps 210-225 have been performed on each node in the plurality of nodes, the process moves to step 235 where the number of iterations of steps 210-230 that have been performed on all of the plurality of nodes is checked. If the number of iterations is too low, another iteration of steps 210-235 is performed. If the number is satisfactory then the process moves on to step 240. In one exemplary embodiment, the number of iterations is approximately 50. However, those skilled in the art will understand that the number of iterations may be adjusted based on the problem to be solved and the quality of the desired result.

Figure 3:
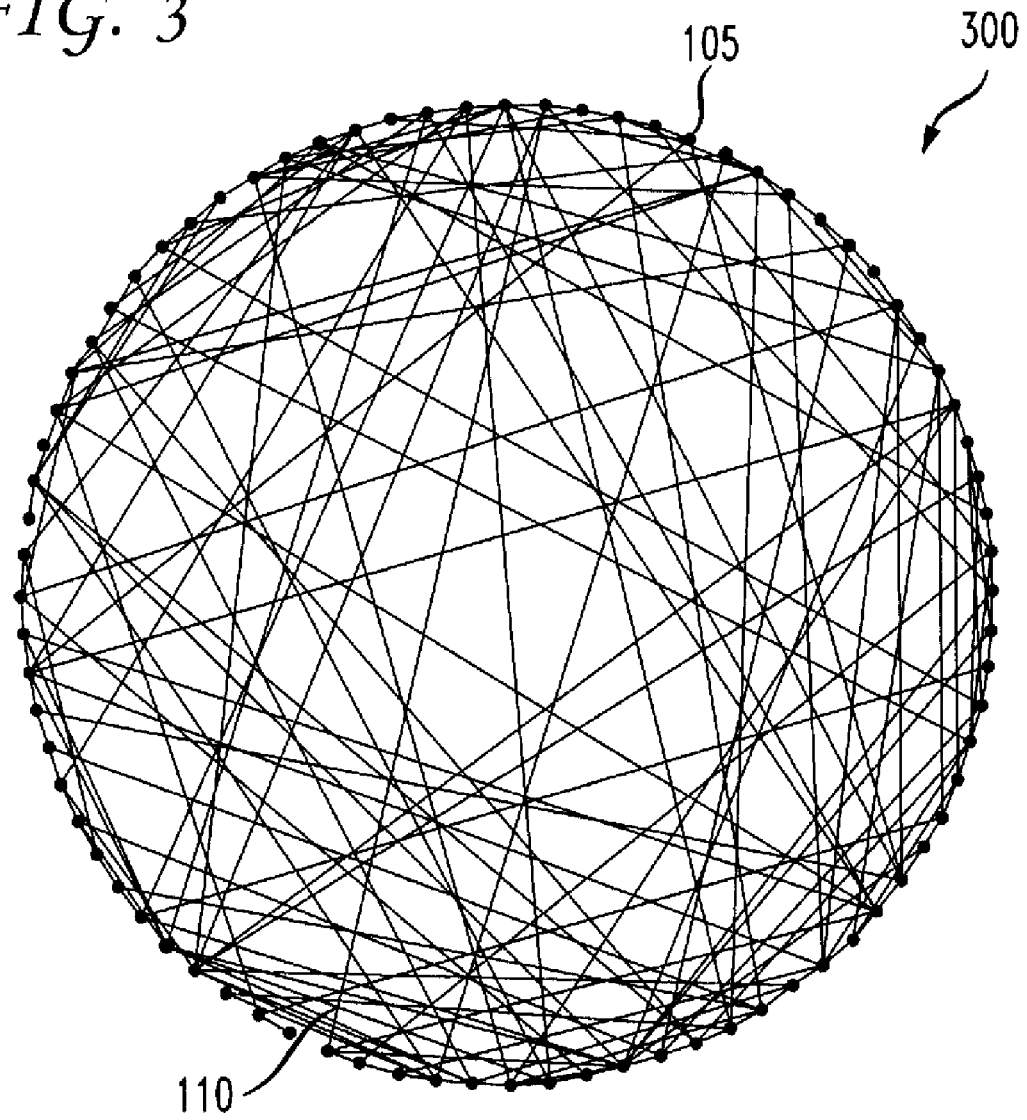
FIG. 3 illustrates an exemplary edge-length minimized graph produced by the method implemented according to an embodiment of the invention.

In step 240, the angular order of the nodes is preserved, but a uniform distribution along the circle is imposed as shown in the circular graph 300 of FIG. 3. This step is performed because the global minimum of edge lengths is attained when the entire plurality of the individual nodes are collapsed into one position. The redistribution of step 240 prevents this collapse.

After redistribution the process proceeds to step 245, where the number of iterations of step 240 is checked. If the number is too low, the system starts again from step 210. If the number is sufficient then the method 200 is complete. In one exemplary embodiment, the number of iterations may be approximately the same as the number of nodes in the graph being drawn. For example, a graph having approximately 1000 nodes will have approximately 1000 iterations performed. However, those skilled in the art will understand that other factors may also affect the number of iterations that are performed. The result of the method 200 is the generation of an improved circular graph as shown in FIG. 3. That is, using the same data that was used to generate the circular graph 100 of FIG. 1, the method 200 is able to generate the vastly improved circular graph 300 of FIG. 3. In an alternate embodiment the method 200 may also be performed while fixing positions of a number, such as 3, of the plurality nodes 105, to prevent the collapse of the layout.

With reference to FIG. 3, there is shown an exemplary circular layout 300 as may be generated by using the exemplary method 200 described with reference to FIG. 2. The graph 300 comprises a plurality of nodes and a plurality edges. The graph 300 contains fewer edge crossings, lower clutter, and lower density as compared to a traditional circular graph 100 as shown in FIG. 1.

In an alternate embodiment, after method 200 is performed, a dynamic programming process may be performed for further local refinement of the graph. The circular order resulting from method 200 may be further refined by utilizing a method that explicitly considers the discrete nature of the problem. The refinement method may consider every sequence of k nodes, and reorder the sequence in a way that minimizes the total edge length. More formally, assuming that the circle contains n equally spaced nodes named 0, 1, . . . , n–1, where individual point i 105 is located at $$\left(\cos\frac{2\pi i}{n}, \sin\frac{2\pi i}{n}\right).$$

In addition, each of the n nodes is uniquely associated with one of the n circle points via the bijection of $p(i):V \rightarrow \{0, 1, \ldots, n-1\}$. The angular distance between two nodes i and j is defined as: $d_{ij}=\min(p(i)-p(j) \mod n, p(j)-p(i) \mod n)$. Since k nodes $V=\{v_1, v_2, \ldots, v_k\}$, located consecutively at $p(v_1), p(v_1)+1, \ldots, p(v_1)+k-1$, the goal is to reorder V to minimize l(V), the total length of the edges adjacent to V, which is defined as:

$$l(v) = \sum_{(i,j) \in E, i \in v} d_{ij}$$

Minimization of l(V) may be done by a dynamic programming algorithm which rearranges increasingly larger subsets of V. Typical values of k are between 5 and 10. The minimization algorithm is run on each of the n overlapping subsequences of length k until the total edge length cannot be further reduced.

Figure 4:
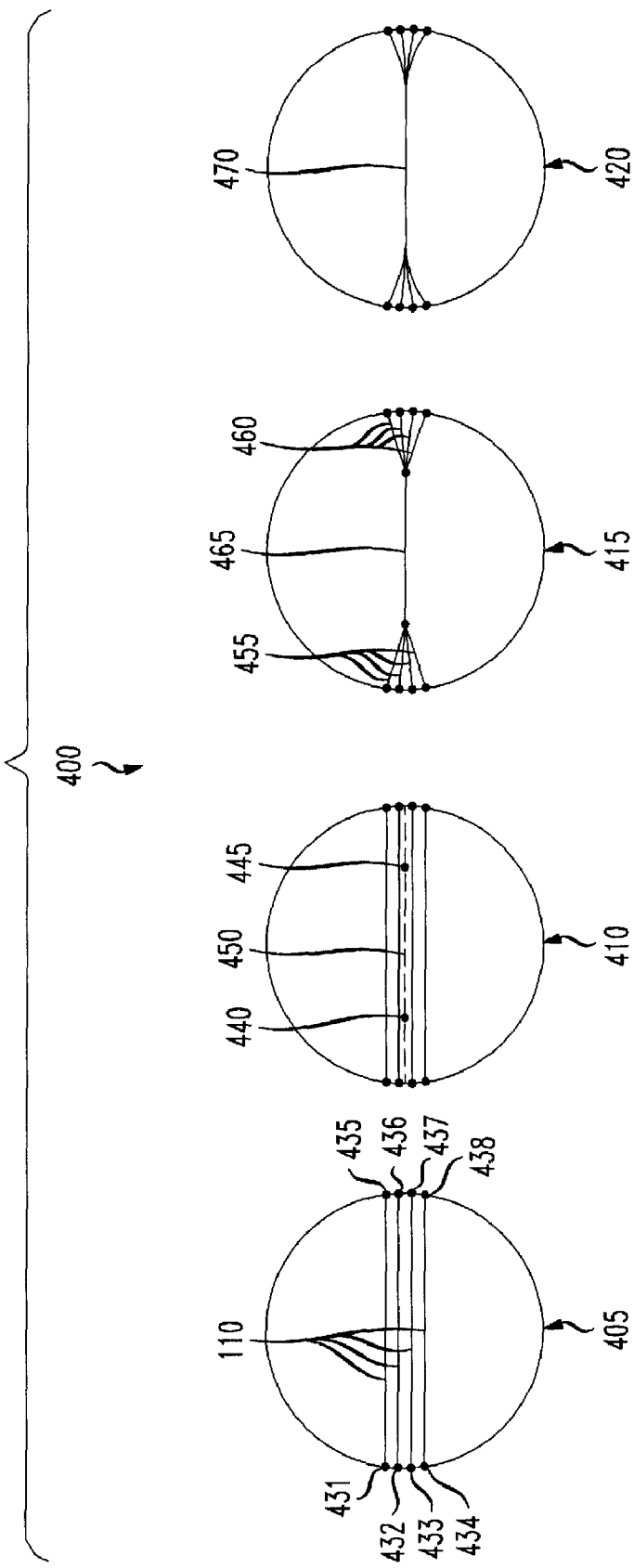
FIG. 4 illustrates the steps of a method of bundling edges together implemented according to an embodiment of the invention.

FIG. 4 illustrates an exemplary embodiment of a method 400 for bundling edges together. The essence of this method 400 is controlled deformation of the edges such that groups of edges share long common segments, thereby improving the utilization of the drawing area by saving ink, and thus increasing clarity. For example, given a set of m lines ("edges" 110), $Q=\{e_1=(v_1, u_1), e_2=(v_2, u_2), \ldots, e_k=(v_m, u_m)\}$, where $v_i$, $u_i \in R^2$. This set includes the 4 edges (431,435), (432,436), (433, 437) and (434, 438).

The first step 405 is to divide the 2m endpoints of the edges into two equally sized sets: S ("sources") and T ("targets"), such that for each $(v_i, u_i) \in Q$, either $v_i \in S$, $u_i \in T$, or $u_i \in S$, $v_i \in T$. The intention is to produce two compact sets, minimizing Euclidean distances between nodes belonging to the same set. This may be achieved by a variant of the K-means algorithm, where each point is iteratively assigned to the set with the closer mean while the means is continually updated. Accordingly, in the given example S={431, 432, 433, 434} and T={435, 436, 437, 438}.

In step 410 centroids of S and T are computed. The line 450, containing centroid S and centroid T, is further calculated. The prospective bundling should pass along this line. More specifically, two points 440 and 445 on line 450 are computed. In Step 415 the bundling is carried out by replacing the original line segments by the following: first, a line from each node of S (431, 432, 433, and 434) to 440, the meeting point of the "sources"; then, a line 465 from 440 to 445; and finally, a line from each node of T (435, 436, 437, and 438) to 445, the meeting point of the "targets."

Since one potential goal is reduction of the use of ink, the exact positions of 440 and 445 minimize the total line length:

$$(440, 445) = \operatorname*{argmin}_{440,445} \sum_{p \in S} \|440 - p\| + \|440 - 445\| + \sum_{p \in T} \|445 - p\|$$

The profitability of the bundling the lines of Q may be inferred, as the ink potentially saved is may be calculated by the difference:

$$\sum_{(v_j - u_j) \in Q} \|v_j - u_j\| - \left( \sum_{p \in S} \|440 - p\| + \|440 - 445\| + \sum_{p \in T} \|445 - p\| \right)$$

In Step 420 the optional use of Bezier splines 470, to smooth out the drawing and make it more readable, is shown. In an alternate embodiment the bundled edges may be various colors in order to further improve readability. Before the edge bundling process described above can be performed, the edges to be bundled should be identified. In one exemplary embodiment the sets of edges are selected such that, by bundling them, the amount of ink used is minimized. The edges may be selected through the use of a bottom-up, agglomerative approach. The process starts with multiple sets, each of which contains a single edge. Then, sets are merged as long as the corresponding bundling improves drawing area utilization. In another embodiment of the method, in order to improve the readability, the edges to be bundled may be limited to those edges that never cross.

Figure 5:
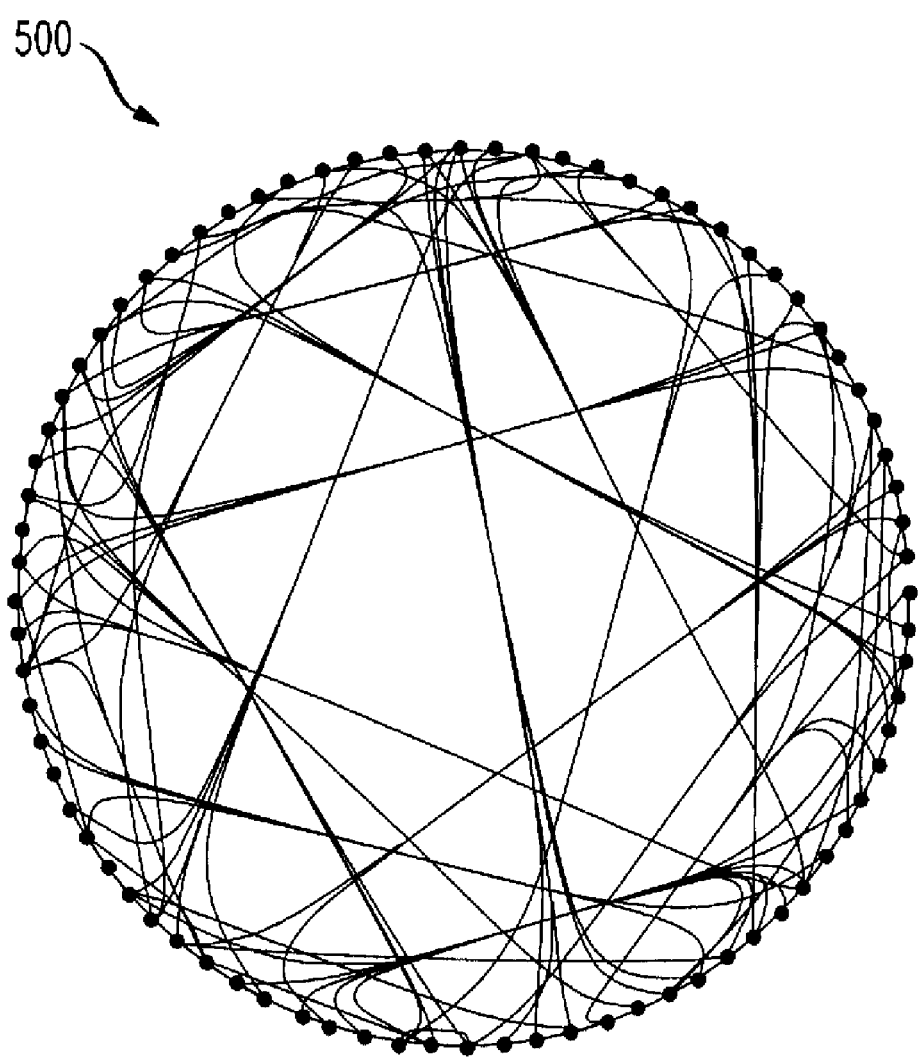
FIG. 5 illustrates an exemplary edge bundled graph produced by the method implemented according to an embodiment of the invention

FIG. 5 illustrates a circular graph 500 that is the possible result of the edge bundling method performed according to an exemplary embodiment of the present invention as described above. The circular graph 500 may also be considered to start from the same initial set of data that originally produced the graph 100 and the improved graph 300. Using the same initial data that produced the unreadable graph 100 and applying the exemplary method 200, the improved circular graph 300 may be produced. Then, the exemplary edge bundling method described with reference to FIG. 4 may be applied to result in the further improved graph 500 of FIG. 5.

Figure 6:
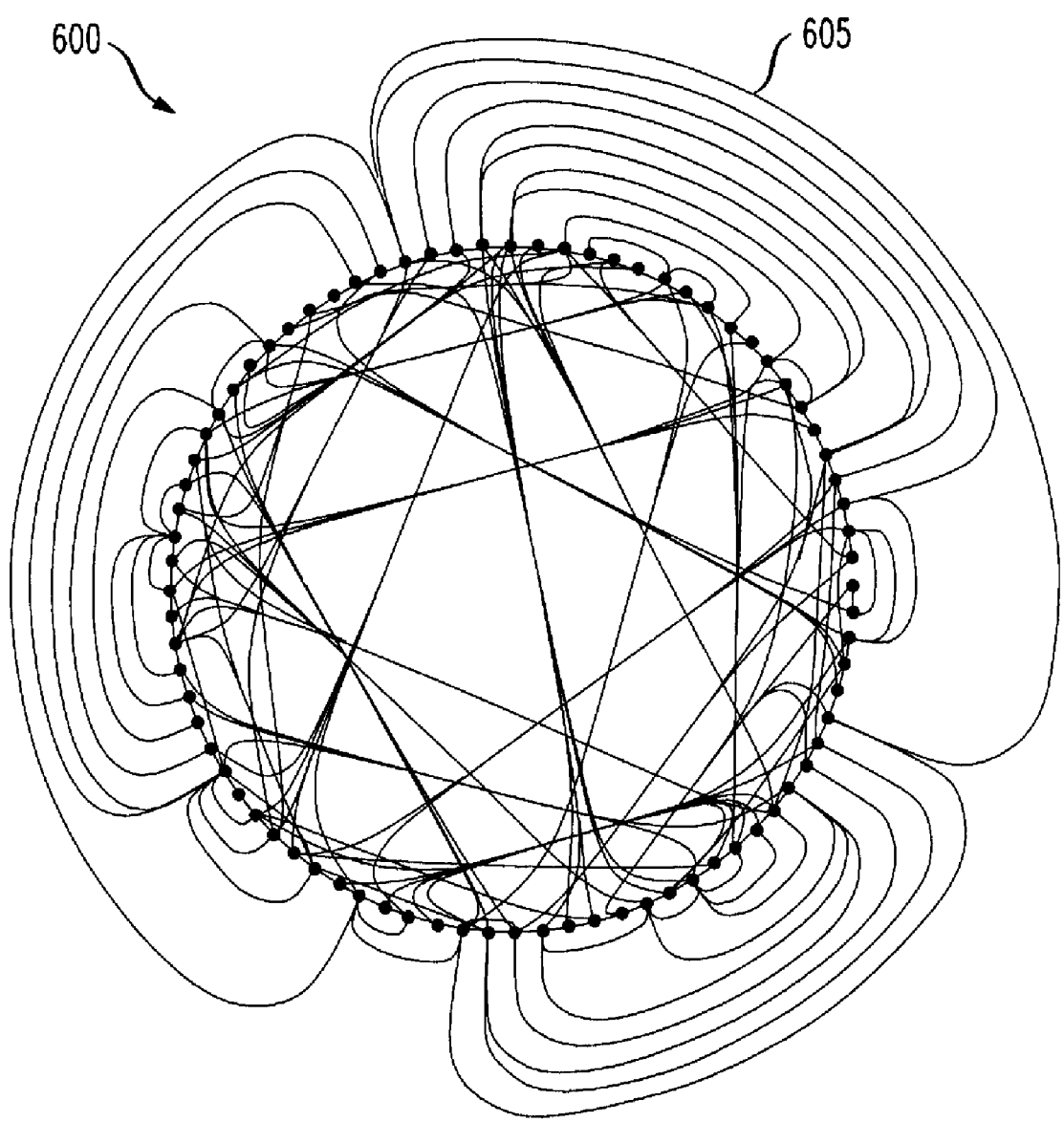
FIG. 6 illustrates an exemplary exterior edge routed and edge-length minimized graph produced by the method implemented according to an embodiment of the invention.

FIG. 6 illustrates a circular graph 600 possibly resulting from the application of an exemplary external edge routing method performed according to an embodiment of the present invention as described below. In this exemplary embodiment, the external edge routing method is applied to the circular graph 300. It shows the improvement in readability and decrease in edge crossing achieved by externally routing edges 605.

The added readability as shown in FIG. 6 may be achieved without altering the node positions. This is accomplished by taking a subset of the edges from the interior of the circle and routing them around the exterior of the circle. This may be done in an optimal way that maximizes the number of extracted edges or minimizes the number of crossings. Since exterior routing of an edge is inherently longer than interior routing, one concern is that edges routed externally should be readable. Therefore, according to an embodiment of the invention, there is no edge crossing within the external face. Since two edges cross in the external face if and only if they cross internally, no internally crossing edges are routed externally. According to an exemplary embodiment, weights are associated with the edges (as explained below), and the process strives to maximize the total weight of the extracted edges.

It should also be noted that "edge flipping" may occur as follows. Each exterior edge 605 <i, j> may be drawn in two ways: either along the short arc connecting i and j, or along the complementary long arc connecting i and j. Therefore, the process assumes that all exterior edges are flipped so that no edge is passing over the length–1 arc connecting point n–1 with point 0 on the circle. Note that this flipping will not introduce any crossing into a crossing-free layout. As a consequence, the process may cut the circle between point n–1 and 0, where no edge passes, and solve an equivalent problem on a line starting at 0 and ending at n–1. By solving the problem on a line, the process determines which edges should be extracted. Then, each of these edges will be drawn on the exterior of the circle along the shorter of the two possible arcs. The intuition behind the algorithm for solving the problem on the line is based on likening each edge to parentheses, where the left endpoint of the edge opens the parenthesis, and the right endpoint closes it. Accordingly, a non-crossing set of edges is equivalent to a valid sequence of nested parentheses. This induces the following recurrence relation, where $P_{ij}$ is the maximal weighted sum of edges that can be legally routed between i and j:

$$p_{i,i+1} = w_{i,i+1} \qquad i = 0, \ldots, n-2$$

$$p_{i,j} = w_{i,j} + \max_{i < k < j} \{p_{ik} + p_{kj}\} \quad i = 0, \ldots, n-3, i+1 < j < n$$

The choice of edge weights ($W_{ij}$) allows flexibility in the optimization goal. The default may be to pick the weights in a way that ensures minimizing the number of edge crossings. To this end, $W_{ij}$ may be set to the number of crossings involving $<p^{-1}(i), p^{-1}(j)>$. In this way, the maximized value $P_{0,n-1}$ is exactly the number of saved edge crossings. Note that there is no problem of double counting, since two extracted edges cannot cross each other. Exterior routing is a very effective technique, which may remove a significant portion of the edge crossings. An additional outcome of exterior routing is that it tends to extract many of the short edges. These edges are often hard to read when drawn as straight lines, as they are almost collinear with the adjacent edges. Furthermore, in another embodiment, co-linearity issue of specific edges may be explicitly addressed by increasing their weights, thus encouraging the algorithm to pick them for exterior routing.

Figure 7:
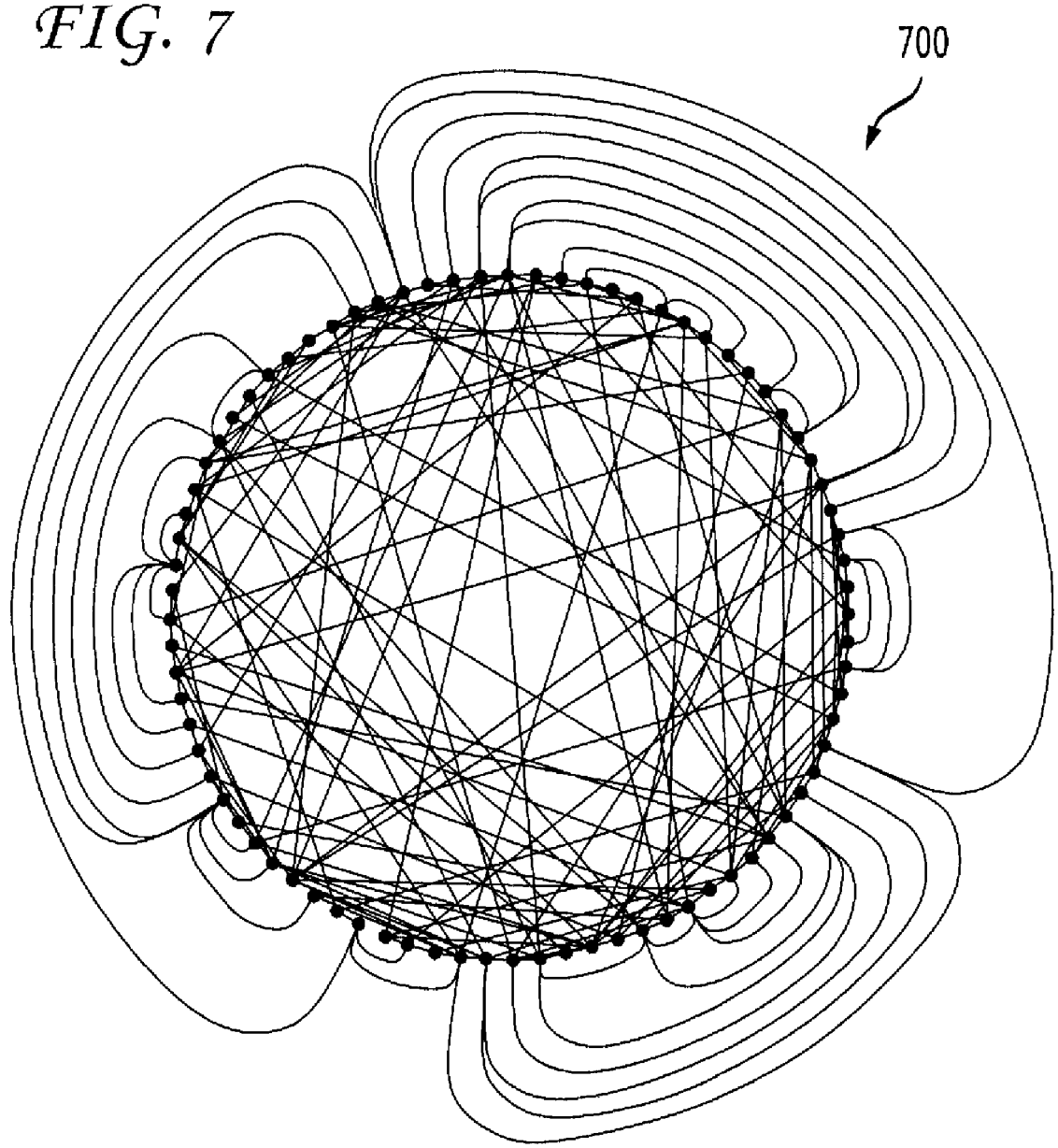
FIG. 7 illustrates an exemplary exterior edge routed and edge bundled graph produced by the method implemented according to an embodiment of the invention.

FIG. 7 illustrates the resulting circular graph 700 based on the combination of the exemplary methods of edge length minimizing, edge bundling and external edge routing. The exemplary methods attempt to capitalize on all available degrees of freedom for the data. Thus, it may be optimal to use one of the methods (e.g., external edge routing, edge bundling, and edge length minimizing) either alone or in combination with one or more of the other methods. Those skilled in the art will be able to appreciate which combination of methods is appropriate for a particular graph.

Those skilled in the art will also understand that the exemplary methods described herein may be implemented as software or software modules that are executed on a processor to display the exemplary graphs described herein.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
   fixing, by a processor, all of a plurality of nodes on a unit circle of a circular layout, except for one of the nodes;
   moving, by the processor, the unfixed node to a barycenter of the fixed plurality of nodes;
   projecting, by the processor, the unfixed node to the unit circle of the circular layout; and
   after the projecting, fixing, by the processor, the unfixed node.

2. The method of claim 1, further comprising:
   performing the first fixing, moving, projecting, and second fixing for each of the remaining plurality of nodes.

3. The method of claim 1, further comprising:
   performing the first fixing, moving, projecting, and second fixing for each of the plurality of nodes a plurality of times.

4. The method of claim 2, further comprising:
   ordering the plurality of nodes uniformly around the unit circle.

5. The method of claim 1, wherein each of the plurality of nodes is to be connected via an edge to at least one other of the plurality of nodes.

6. The method of claim 5, further comprising:
   combining a plurality of edges, wherein each of the edges that are combined connect a unique two of the plurality of nodes.

7. The method of claim 6, wherein none of the plurality of edges that is combined, previous to combining, cross any of the other plurality of edges that are combined, previous to combining.

8. The method of claim 6, wherein the combining includes:
   defining at least two additional nodes that are in the interior of the unit circle, wherein a first of the unique two of the plurality of nodes includes a first new edge connected to one of the at least two additional nodes and a second of the unique two of the plurality of nodes includes a second new edge connected to the other one of the at least two additional nodes.

9. The method of claim 8, wherein the at least two additional nodes are connected by a third new edge.

10. The method of claim 4, further comprising:
    reconnecting at least a portion of the plurality of nodes via edges that are exterior to the unit circle.

11. The method of claim 10, wherein none of the edges that are exterior to the unit circle cross any of the other edges that is exterior to the unit circle.

12. A system, comprising:
    a memory storing data corresponding to a plurality of nodes;
    a processor receiving the data and generating a circular layout from the data, wherein the processor fixes all of the plurality of nodes to a unit circle, except for one of the nodes, moves the unfixed node to a barycenter of the fixed plurality of nodes, projects the unfixed node to the unit circle of the circular layout, and after the unfixed node is projected, fixes the unfixed node.

13. The system of claim 12, further comprising:
    a display for displaying the circular layout.

14. The system of claim 12, wherein the processor performs the first fixing, moving, projecting, and second fixing for each of the remaining plurality of nodes.

15. The system of claim 14, wherein the processor further orders the plurality of nodes uniformly around the unit circle.

16. The system of claim 12, wherein the memory includes data corresponding to a plurality of edges connecting the nodes, and wherein the processor combines a plurality of edges, wherein each of the edges that are combined connect a unique two of the plurality of nodes.

17. The system of claim 16 wherein, when the processor combines the plurality of edges, at least two additional nodes are defined that are in the interior of the unit circle, wherein a first of the unique two of the plurality of nodes includes a first new edge connected to one of the at least two additional nodes and a second of the unique two of the plurality of nodes includes a second new edge connected to the other one of the at least two additional nodes.

18. The system of claim 12, wherein the processor reconnects at least a portion of the plurality of nodes via edges that is exterior to the unit circle.

19. The system of claim 16 wherein none of the edges that are exterior to the circle cross any of the other edges that is exterior to the unit circle.

20. A system comprising a memory storing a set of instructions and a processor for executing the instructions, the set of instructions being operable to:
    fix all of a plurality of nodes on a unit circle of a circular layout, except for one of the nodes;
    move the unfixed node to a barycenter of the fixed plurality of nodes;
    project the unfixed node to the unit circle of the circular layout; and
    after the projecting, fix the unfixed node.

* * * * *